United States Patent
White et al.

(10) Patent No.: US 12,282,963 B1
(45) Date of Patent: Apr. 22, 2025

(54) AUTOMATEDLY GENERATING AND ISSUING ACCIDENT DATA GATHERING RECOMMENDATIONS FOLLOWING A VEHICLE ACCIDENT

(71) Applicant: UIPCO, LLC, San Antonio, TX (US)

(72) Inventors: Angelica Nichole White, Spring Branch, TX (US); Sean Carl Mitchem, San Antonio, TX (US); Sean Michael Wayne Craig, San Antonio, TX (US); Subhalaskshmi Selvam, Allen, TX (US); Christopher Russell, The Colony, TX (US); Brian Howard Katz, San Antonio, TX (US); Roberto Virgillio Jolliffe, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 17/667,300

(22) Filed: Feb. 8, 2022

(51) Int. Cl.
*G06Q 40/08* (2012.01)
(52) U.S. Cl.
CPC .................. *G06Q 40/08* (2013.01)
(58) Field of Classification Search
CPC ...................................................... G06Q 40/08
See application file for complete search history.

(56) References Cited

U.S. PATENT DOCUMENTS

| | | |
|---|---|---|
| 6,853,849 B1 | 2/2005 | Tognazzini |
| 8,160,764 B2 | 4/2012 | Choi et al. |
| 9,196,159 B1 | 11/2015 | Kerr |
| 9,773,281 B1 * | 9/2017 | Hanson ................ H04W 4/023 |
| 9,786,154 B1 | 10/2017 | Potter et al. |

(Continued)

FOREIGN PATENT DOCUMENTS

| | | |
|---|---|---|
| DE | 102015209853 A1 | 12/2016 |
| JP | 2010182287 A | 8/2010 |

(Continued)

OTHER PUBLICATIONS

Chong et al., "Traffic accident data mining using machine learning paradigms." Fourth International Conference on Intelligent Systems Design and Applications (ISDA'04), Hungary. 2004. (Year: 2004).

(Continued)

*Primary Examiner* — Christine M Behncke
*Assistant Examiner* — Henry H Jung
(74) *Attorney, Agent, or Firm* — Potomac Law Group, PLLC; Dannon G. Allbee

(57) ABSTRACT

Methods and systems described herein are directed to automatedly generating and issuing accident data gathering recommendations for a vehicle accident occurrence. In response to a recommendation system detecting an occurrence of a vehicle accident, the system can retrieve initial accident data for the occurrence. Using the initial accident data, the system can generate accident data gathering recommendations to obtain additional accident data via mapping to one or more characteristics for the vehicle accident occurrence. The recommendations, when executed, can yield additional accident data that can be compiled with the initial accident data into a vehicle accident evidence package.

18 Claims, 8 Drawing Sheets

(56) References Cited

U.S. PATENT DOCUMENTS

| | | | |
|---|---|---|---|
| 9,886,841 B1 | 2/2018 | Nave et al. | |
| 10,086,782 B1 | 10/2018 | Konrardy et al. | |
| 10,106,156 B1 | 10/2018 | Nave et al. | |
| 10,165,429 B1 | 12/2018 | Young et al. | |
| 10,360,742 B1 * | 7/2019 | Bellas | G07C 5/008 |
| 10,580,306 B1 | 3/2020 | Harris et al. | |
| 10,586,122 B1 | 3/2020 | Gingrich et al. | |
| 10,660,806 B1 | 5/2020 | Nelson-Herron et al. | |
| 10,692,149 B1 | 6/2020 | Loo et al. | |
| 10,769,456 B2 | 9/2020 | Sathyanarayana et al. | |
| 10,789,650 B1 | 9/2020 | Nave et al. | |
| 10,803,527 B1 * | 10/2020 | Zankat | G06V 30/40 |
| 10,853,882 B1 * | 12/2020 | Leise | G06T 5/50 |
| 10,867,495 B1 | 12/2020 | Venetianer et al. | |
| 11,379,886 B1 | 7/2022 | Fields et al. | |
| 11,503,153 B1 | 11/2022 | Hansen et al. | |
| 11,620,862 B1 | 4/2023 | Serrao et al. | |
| 11,669,590 B2 * | 6/2023 | Hyland | G06N 20/00 382/159 |
| 11,679,763 B2 | 6/2023 | Nagasawa | |
| 11,692,838 B1 | 7/2023 | Gibson et al. | |
| 11,735,050 B2 | 8/2023 | Garg et al. | |
| 11,781,883 B1 | 10/2023 | Dabell | |
| 2011/0117878 A1 | 5/2011 | Barash et al. | |
| 2014/0379523 A1 | 12/2014 | Park | |
| 2015/0084757 A1 | 3/2015 | Annibale et al. | |
| 2015/0145695 A1 * | 5/2015 | Hyde | G08G 1/166 340/905 |
| 2016/0009279 A1 * | 1/2016 | Jimaa | B60W 30/16 701/96 |
| 2016/0169688 A1 | 6/2016 | Kweon et al. | |
| 2017/0053461 A1 | 2/2017 | Pal et al. | |
| 2017/0072850 A1 | 3/2017 | Curtis et al. | |
| 2017/0213462 A1 | 7/2017 | Prokhorov | |
| 2017/0248949 A1 | 8/2017 | Moran et al. | |
| 2017/0248950 A1 | 8/2017 | Moran et al. | |
| 2018/0061253 A1 | 3/2018 | Hyun | |
| 2018/0286248 A1 | 10/2018 | Choi et al. | |
| 2018/0293864 A1 | 10/2018 | Wedig et al. | |
| 2018/0297593 A1 | 10/2018 | Pitale et al. | |
| 2018/0300964 A1 | 10/2018 | Lakshamanan et al. | |
| 2018/0308342 A1 | 10/2018 | Hodge | |
| 2018/0308344 A1 | 10/2018 | Ravindranath et al. | |
| 2018/0364722 A1 | 12/2018 | Schlesinger et al. | |
| 2019/0095877 A1 * | 3/2019 | Li | G06V 20/63 |
| 2019/0174289 A1 | 6/2019 | Martin et al. | |
| 2019/0202448 A1 | 7/2019 | Pal et al. | |
| 2019/0253861 A1 | 8/2019 | Horelik et al. | |
| 2019/0327597 A1 | 10/2019 | Katz et al. | |
| 2019/0385457 A1 | 12/2019 | Kim et al. | |
| 2020/0043097 A1 * | 2/2020 | Aznaurashvili | G06Q 50/265 |
| 2020/0059776 A1 | 2/2020 | Martin et al. | |
| 2020/0105120 A1 | 4/2020 | Werner et al. | |
| 2020/0274962 A1 | 8/2020 | Martin et al. | |
| 2020/0312046 A1 | 10/2020 | Righi et al. | |
| 2021/0023946 A1 | 1/2021 | Johnson et al. | |
| 2021/0027409 A1 | 1/2021 | Nair et al. | |
| 2021/0030593 A1 | 2/2021 | Kellogg | |
| 2021/0061209 A1 | 3/2021 | Park et al. | |
| 2021/0219257 A1 | 7/2021 | Anand et al. | |
| 2021/0225155 A1 | 7/2021 | Potter et al. | |
| 2021/0256257 A1 | 8/2021 | Taccari et al. | |
| 2021/0304593 A1 | 9/2021 | Matus et al. | |
| 2022/0044024 A1 | 2/2022 | Sambo et al. | |
| 2022/0063609 A1 | 3/2022 | Nagasawa | |
| 2022/0095975 A1 | 3/2022 | Aluf et al. | |
| 2022/0169175 A1 | 6/2022 | Choi | |
| 2022/0321343 A1 | 10/2022 | Bahrami et al. | |
| 2022/0383256 A1 | 12/2022 | Roh et al. | |
| 2023/0001871 A1 | 1/2023 | Neubauer et al. | |
| 2023/0122572 A1 | 4/2023 | Choi | |
| 2023/0166743 A1 | 6/2023 | Heck et al. | |
| 2023/0169845 A1 | 6/2023 | Turner et al. | |
| 2023/0211780 A1 | 7/2023 | Tanaka et al. | |
| 2023/0242099 A1 | 8/2023 | Pishehvari et al. | |
| 2023/0282350 A1 | 9/2023 | Devore et al. | |
| 2023/0298468 A1 | 9/2023 | Jha et al. | |
| 2024/0089701 A1 | 3/2024 | Motoyama et al. | |

FOREIGN PATENT DOCUMENTS

| | | |
|---|---|---|
| JP | 2015504616 A | 2/2015 |
| JP | 6940612 B2 | 9/2021 |
| JP | 7470486 B2 | 4/2024 |
| WO | 2019028349 A1 | 2/2019 |
| WO | 2022201639 A1 | 9/2022 |

OTHER PUBLICATIONS

Kumeda et al. "Classification of road traffic accident data using machine learning algorithms." 2019 IEEE 11th international conference on communication software and networks (ICCSN). IEEE, 2019. (Year: 2019).

Santo et al. "Machine learning approaches to traffic accident analysis and hotspot prediction." Computers 10.12 (2021): 157. (Year: 2021).

Wang, Junhua, et al. "Modeling when and where a secondary accident occurs." Accident Analysis & Prevention 130 (2019): 160-166. (Year: 2019).

* cited by examiner

AUTOMATEDLY GENERATING AND ISSUING ACCIDENT DATA GATHERING RECOMMENDATIONS FOLLOWING A VEHICLE ACCIDENT

TECHNICAL FIELD

The present disclosure is directed to automatically generating and issuing accident data gathering recommendations subsequent to detection of a vehicle accident.

BACKGROUND

There are over 6.5 million vehicle accidents each year in the U.S. alone. Damage from these accidents, according to one study, amounts to over $870 billion dollars each year. Involvement in such vehicle accidents is a distressing experience. For example, an immediate focus at the time of the accident may be contemplation of fault and/or concern for an amount of liability. As a result, the accurate recollection of events of the accident can be blurred, thus making a proper determination of responsibility for the vehicle accident difficult. Further, the pressing concerns occurring during an accident can cause people to fail to gather clear records of the data or take other remedial actions such as checking for types of vehicle damage, getting witness statements, and determining affected property.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
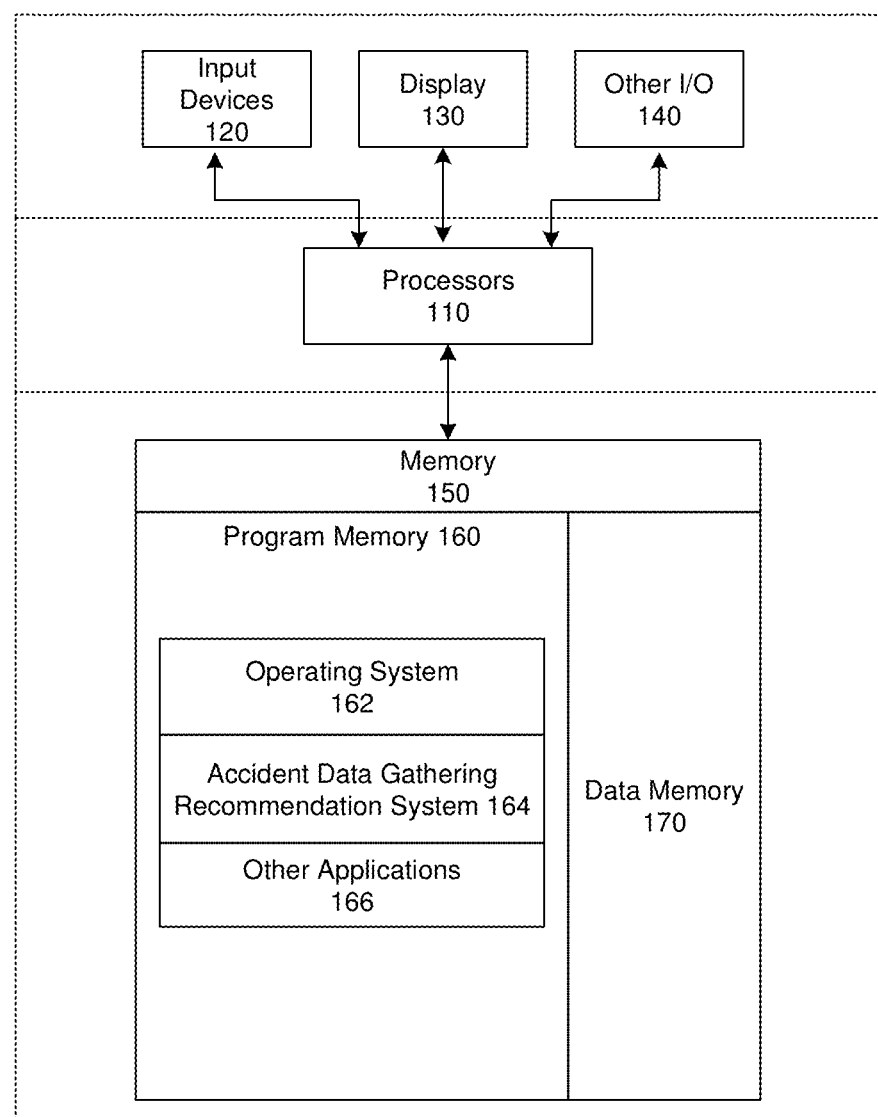
FIG. 1 is a block diagram illustrating an overview of devices on which some implementations can operate.

Aspects of the present disclosure are directed to automatedly generating and issuing accident data gathering recommendations subsequent to detection of a vehicle accident occurrence. A recommendation system can detect a vehicle accident occurrence and retrieve initial accident data from an individual, vehicle, and/or device involved in the vehicle accident occurrence. Using the retrieved initial accident data, the recommendation system can implement a machine learning model to determine certain characteristics for the vehicle accident occurrence. The recommendation system can then generate and issue data gathering recommendations mapped to the certain characteristics. The data gathering recommendations can, when implemented, generate additional accident data. The recommendation system can then compile the initial and additional accident data into an insurance claim package that can be used to, for instance, arrive at a determination of fault, support an insurance claim, or trigger remedial actions.

The recommendation system can detect a vehicle accident occurrence using information (or data) provided by an individual, a vehicle, and/or a device involved in the occurrence. It is contemplated that the data provided by the individual can include, for example, images taken at the scene of the vehicle accident occurrence and/or a description for the accident scene that can be provided in written form or later reduced to writing. In some implementations, the aforementioned device can include a communications and/or computing device such as a cellular telephone or laptop computer, and/or a wearable for the individual. Data that can be provided by the vehicle and/or the device can be data that the individual has opted to divulge and which can be automatically retrieved by the recommendation system. Such data can include, for example, sensor data defining one or more aspects of motion or absence thereof, positioning, lighting, fluid status, and/or temperature, to name a few. Such data can further include imaged data which can, for instance, be captured by one or more camera systems of the vehicle during its operation. Data that can be provided by the wearable can include biometric data including eye movement, blood pressure, heart rate, sleep pattern, and overall movement from a datum, e.g., rotation. Each of the above-described data can define investigative data for enabling the recommendation system to detect a vehicle accident occurrence.

In view of detecting a vehicle accident occurrence, the recommendation system can automatically generate and issue recommendations for primary actions to be taken by the individual. In some implementations, the primary actions can include notifying first responders, evaluating for relevant injury, and obtaining and maintaining a safe location. In some implementations, the primary actions can further include instructions for generating a first photographic record for the vehicle accident occurrence. That is, the instructions can, for example, suggest and/or request that the individual image one or more of any observed impact(s) to the vehicle, observed areas of fluid leakage, a 360° view from inside the vehicle, observed damage to any other vehicle(s) at the scene of the accident occurrence, etc. The first photographic record can define initial accident data for the detected vehicle accident occurrence.

In some implementations, the above-described investigative data and the first photographic record can define initial accident data for the detected vehicle accident occurrence. In some implementations, the recommendation system can implement a machine learning model on the initial accident data to determine expected characteristics for the vehicle accident occurrence. The characteristics can include, for example, types of vehicle damage indicative of one or more of an extent of damage, the presence of dangerous fluid leakage, and/or airbag deployment. The characteristics can further include, for example, a determination that a certain type of injury is likely, that bystanders may be witnesses to the vehicle accident occurrence, and/or that a utility in the vicinity of the vehicle accident occurrence may be impacted.

In some implementations, the machine learning model can be trained to match the initial accident data for a vehicle accident occurrence to one or more characteristics for the occurrence. The machine learning model can be trained using training data where the one or more characteristics are determined from prior initial accident data for a multitude of historical insurance claims records and conclusions or observations for those records. That is, the training data can include matching pairs of the prior initial accident data to the one or more characteristics, where the pairs are a result of a comparison between a type of the prior initial accident data for a prior vehicle accident occurrence and conclusions, observations, or outcomes of a prior insurance claim. In this regard, the historical insurance claims records initial accident data can, for instance, include driver and/or other individual descriptions for a vehicle accident, images of vehicle damage for a vehicle accident, images of a scene of one or more vehicle accidents, payout information, and/or images of personal property damage. The characteristics can include, for example, a type of vehicle damage, a type of bodily injury, a likelihood that a bystander is an eyewitness, etc. resulting from the insurance claim. Each pair of historical initial accident data and accident characteristics can be applied to a model, with the initial accident data provided as input, predicted accident characteristics compared to the actual accident characteristics, and, based on the comparison, model parameters updated to train the model.

Once the model has been trained, it can be used to generate characteristic for a detected accident when initial data is gathered. The recommendation system can then generate and issue further data gathering recommendations mapped to one or more of the generated characteristics. In other words, the recommendation system can, according to predetermined formulations for the recommendations, analyze the characteristics to determine one or more best-matching recommendations. For example, if a characteristic according to the above-described machine learning indicates "frame damage," the recommendation system can generate and issue a recommendation to take additional photographs at and/or around an affected wheel well or other area implicated for the characteristic. In this regard, the recommendation can, for example, specifically direct that images be captured, for example, in the areas of the wheel well at a certain angle and distance from the vehicle. Thus, one or more of additional photographs resulting from a recommendation can define a second photographic record for the vehicle accident occurrence. As another example, if a characteristic according to the above-described machine learning indicates the presence of bystanders, the recommendation to the individual involved in the vehicle accident occurrence can be to attempt to obtain a witness statement from the bystander(s).

When implemented by the individual involved in the vehicle accident occurrence, the recommendation system can retrieve additional accident data according to one or more issued recommendations. In some implementations, the initial accident data and the additional accident data can be compiled into a package. It is contemplated that the package can then be used for a variety of purposes, including, for example, a determination of fault, as a record in a judicial proceeding, an insurance claim, and/or as a record that may be provided to one or more affiliates of an operator of the recommendation system.

Existing manners for developing a complete accounting for a vehicle accident occurrence have largely been retrospective. That is, the collection of specific details for the occurrence have primarily been ascertained based on images and/or descriptions of vehicle damage which are obtained at a time that is remote from that of the accident occurrence. Accordingly, their value can become diminished. For instance, images of vehicle damage which are not taken at the vehicle accident scene may later introduce supplemental damage resulting from outside storage and/or transportation from the accident scene. Additionally, individual accounts from those involved in a vehicle accident occurrence and/or witnesses to the occurrence can introduce less than optimal recall of actual events when not obtained at the accident scene. In contrast, implementations of the recommendation system according to the present technology provide for gathering of accident data at a time which is most near to a vehicle accident occurrence. This is the case since an individual involved in a vehicle accident occurrence can be prompted to begin initial accident data collection immediately following detection for the occurrence. Still more, additional accident data stemming from analysis of the initial accident data and serving to refine findings of the initial accident data can be developed to overcome the temporal inadequacies discussed above.

Several implementations are discussed below in more detail in reference to the figures. FIG. 1 is a block diagram illustrating an overview of devices on which some implementations of the disclosed technology can operate. The devices can comprise hardware components of a device 100 that automatedly generates and issues vehicle accident data gathering recommendations following an occurrence of a vehicle accident. Device 100 can include one or more input devices 120 that provide input to the Processor(s) 110 (e.g. CPU(s), GPU(s), HPU(s), etc.), notifying it of actions. The actions can be mediated by a hardware controller that interprets the signals received from the input device and communicates the information to the processors 110 using a communication protocol. Input devices 120 include, for example, a mouse, a keyboard, a touchscreen, an infrared sensor, a touchpad, a wearable input device, a camera- or image-based input device, a microphone, or other user input devices.

Processors 110 can be a single processing unit or multiple processing units in a device or distributed across multiple devices. Processors 110 can be coupled to other hardware devices, for example, with the use of a bus, such as a PCI bus or SCSI bus. The processors 110 can communicate with a hardware controller for devices, such as for a display 130. Display 130 can be used to display text and graphics. In some implementations, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The processors 110 can have access to a memory 150 in a device or distributed across multiple devices. A memory includes one or more of various hardware devices for volatile and non-volatile storage, and can include both read-only and writable memory. For example, a memory can comprise random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, accident data gathering recommendation system 164, and other application programs 166. Memory 150 can also include data memory 170, e.g., investigative data, initial accident data, historical insurance claims record data, additional accident data, insurance claims formatting data, configuration data, settings, user options or preferences, etc., which can be provided to the program memory 160 or any element of the device 100.

Some implementations can be operational with numerous other computing system environments or configurations. Examples of computing systems, environments, and/or configurations that may be suitable for use with the technology include, but are not limited to, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2:
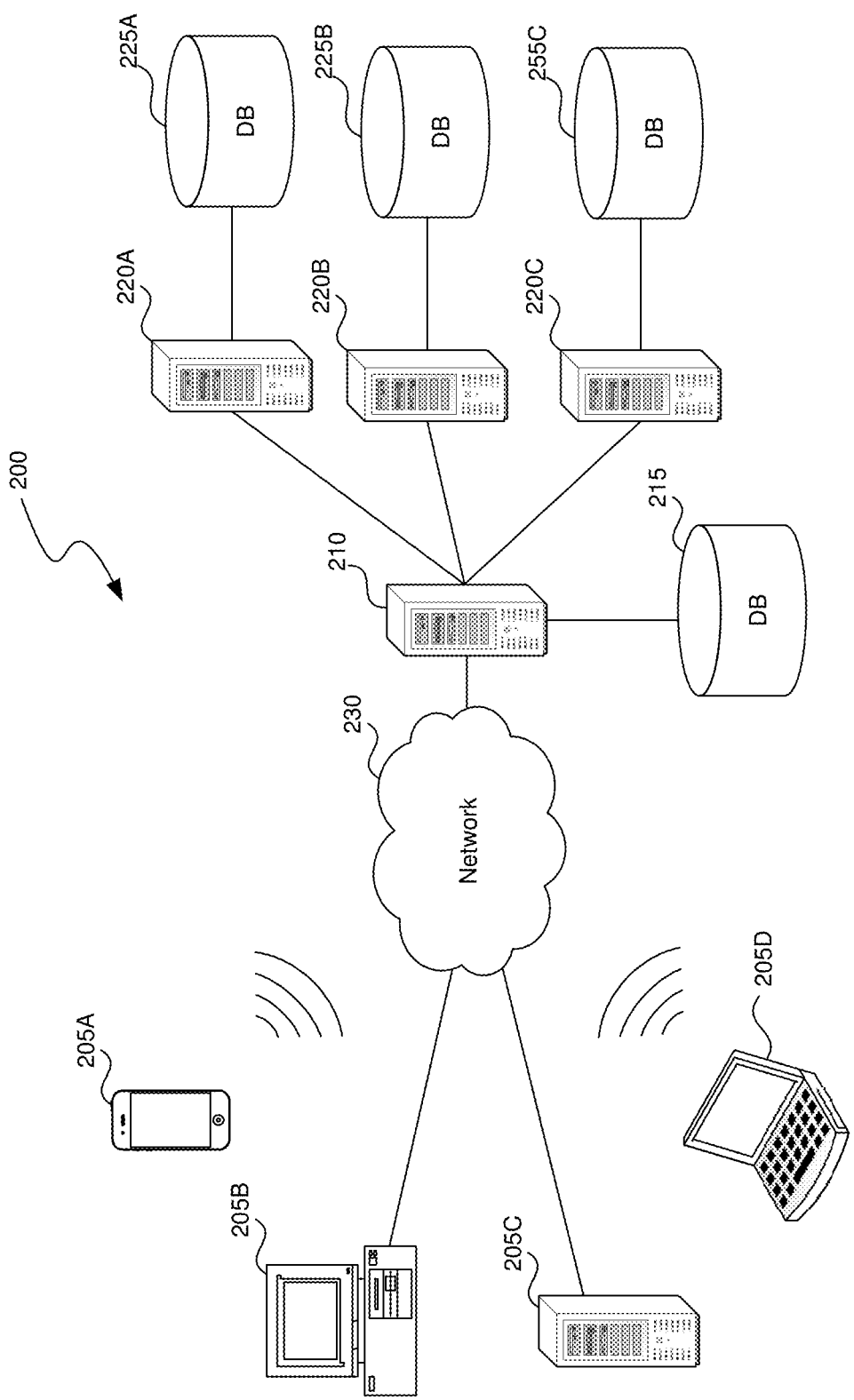
FIG. 2 is a block diagram illustrating an overview of an environment in which some implementations can operate.

FIG. 2 is a block diagram illustrating an overview of an environment 200 in which some implementations of the disclosed technology can operate. Environment 200 can include one or more client computing devices 205A-D, examples of which can include device 100. Client computing devices 205 can operate in a networked environment using logical connections through network 230 to one or more remote computers, such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 can correspond to a group of servers, and each of these servers can share a database or can have their own database. Databases 215 and 225 can warehouse (e.g. store) information such as investigative data, initial accident data, historical insurance claims record data, additional accident data, and insurance claims formatting data that may be on a database for the recommendation system 164. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. Client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
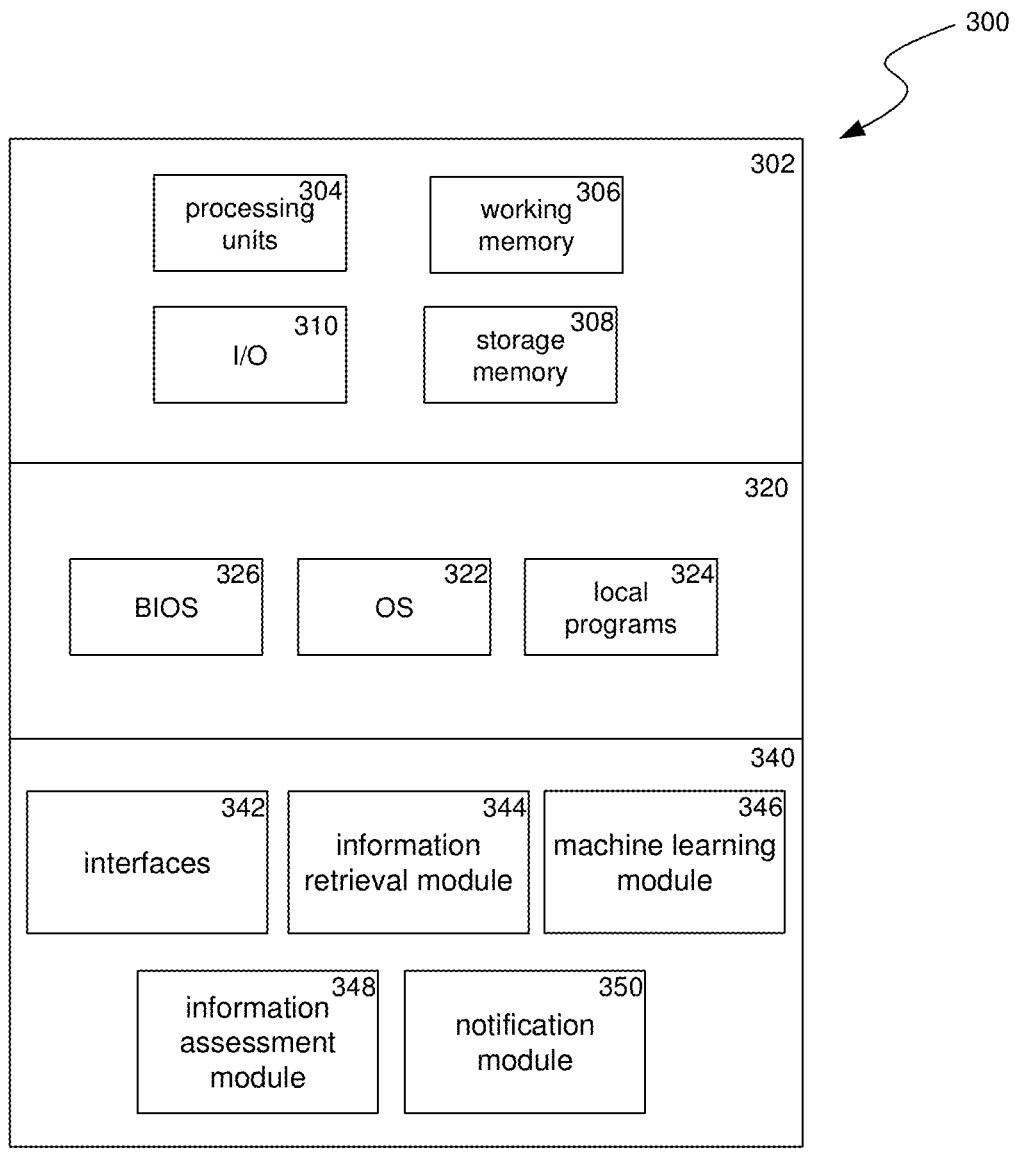
FIG. 3 is a block diagram illustrating components which, in some implementations, can be used in a system employing the disclosed technology.

FIG. 3 is a block diagram illustrating components 300 which, in some implementations, can be used in a system employing the disclosed technology. The components 300 include hardware 302, general software 320, and specialized components 340. As discussed above, a system implementing the disclosed technology can use various hardware including processing units 304 (e.g. CPUs, GPUs, APUs, etc.), working memory 306, storage memory 308 (local storage or as an interface to remote storage, such as storage 215 or 225), and input and output devices 310. In various implementations, storage memory 308 can be one or more of: local devices, interfaces to remote storage devices, or combinations thereof. For example, storage memory 308 can be a set of one or more hard drives (e.g. a redundant array of independent disks (RAID)) accessible through a system bus or can be a cloud storage provider or other network storage accessible via one or more communications networks (e.g. a network accessible storage (NAS) device, such as storage 215 or storage provided through another server 220). Components 300 can be implemented in a client computing device such as client computing devices 205 or on a server computing device, such as server computing device 210 or 220.

General software 320 can include various applications including an operating system 322, local programs 324, and a basic input output system (BIOS) 326. Specialized components 340 can be subcomponents of a general software application 320, such as local programs 324. Specialized components 340 can include interfaces 342, an information retrieval module 344, a machine learning module 346, an information assessment module 348, a notification module 350, and components which can be used for providing user interfaces, transferring data, and controlling the specialized components, such as interfaces 342. In some implementations, components 300 can be in a computing system that is distributed across multiple computing devices or can be an interface to a server-based application executing one or more of specialized components 340. Although depicted as separate components, specialized components 340 may be logical or other nonphysical differentiations of functions and/or may be submodules or code-blocks of one or more applications.

In some implementations, information retrieval module 344 can retrieve data to be provided by an individual involved in a vehicle accident occurrence, the vehicle itself, a computing and/or communications device, and/or any sensing device used or worn by the individual. Such retrieval can occur in response to the individual personally transmitting data. In a case in which data is to be retrieved from either the vehicle or one or more of the noted devices, retrieval can occur continuously or during one or more time periods, depending on the conditions for release of the data.

In some implementations, machine learning module 346 can intake data from the information retrieval module 344 to determine characteristics for a vehicle accident occurrence. To carry out the determination, machine learning module 346 can convert retrieved, initial accident data to machine learning model input. The machine learning module 346 can then apply the initial accident data to a trained machine learning model that can then generate the characteristics.

In some implementations, information assessment module 348 can, using the generated characteristics from machine learning module 346, determine a mapping of one or more of those characteristics to, respectively, one or more predetermined accident data gathering recommendations. That is, one or more characteristics may interrelate such that they can be mapped to a same recommendation or multiple, different recommendations. In this regard, the one or more predetermined recommendations can describe suggestions or instructions for obtaining additional accident data, i.e., accident data that can be more informative than the initial accident data. In some implementations, the particular mapping can be according to a type, degree, and/or a condition for the characteristic. For example, if the characteristic indicates vehicle frame damage, it is contemplated that the recommendation can include guidance for photographing the point of impact from a variety of angles. As another example, if the characteristic indicates battery impact, it is contemplated that the recommendation can include guidance for photographing the portion of the vehicle most near a battery fluid leakage. As yet another example, if the characteristic indicates "likely eyewitness," the recommendation can include guidance to attempt to obtain a witness statement from the person. Here, the term "guidance" can include, for example, instructions for executing the recommendation. Thus, in the above examples, the guidance can include advice as to positioning with respect to the vehicle when taking the photographs, and questions that would be desirable to ask a witness.

In some implementations, notification module 350 can receive one or more of the accident data gathering recommendations from information assessment module 348 and transmit the same to an individual involved in a vehicle accident occurrence. In this regard, it can be understood that the term "individual involved in a vehicle accident occurrence" can mean a driver and/or a passenger of a vehicle involved in the occurrence.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 4:
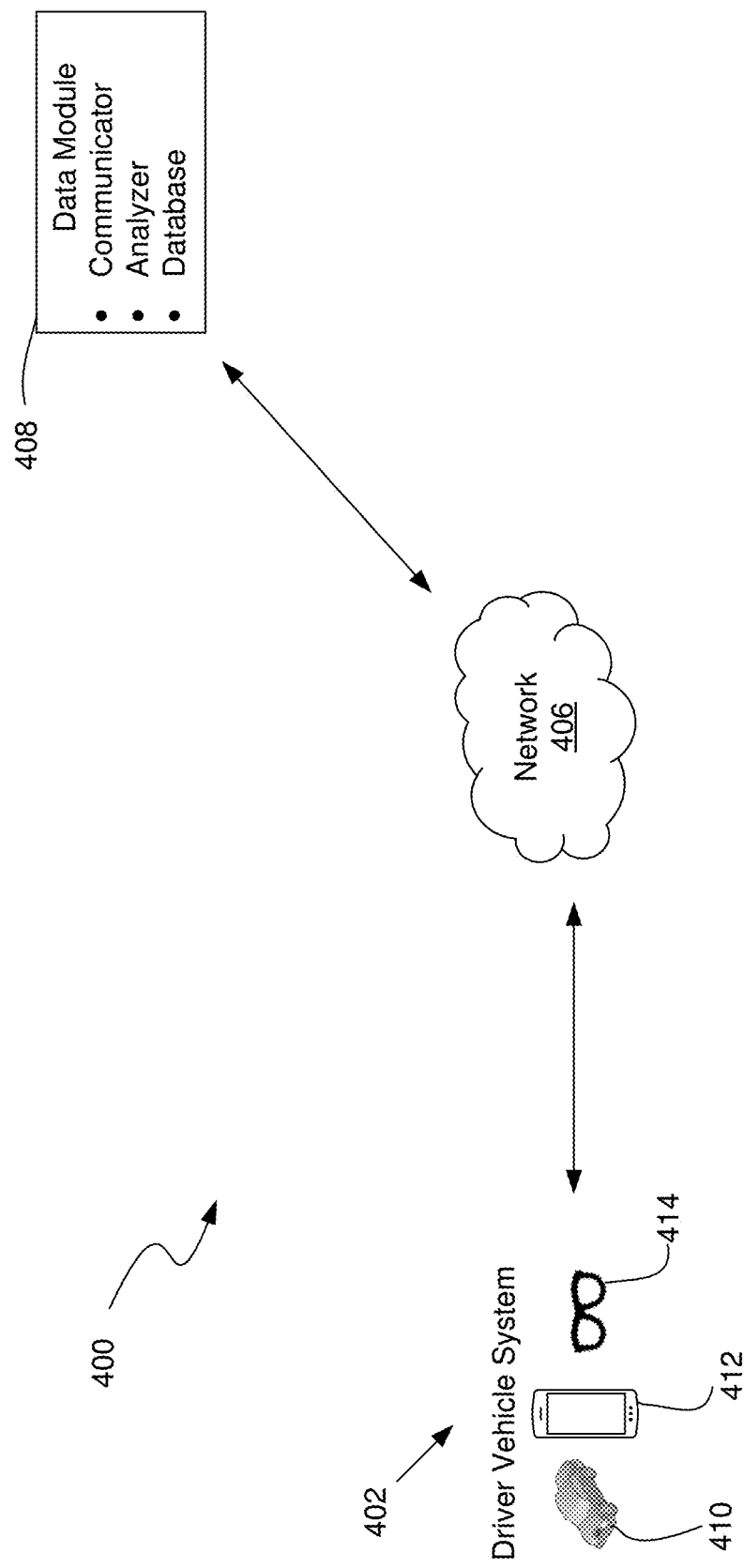
FIG. 4 is a high-level conceptual diagram illustrating a flow of investigative data from multiple information sources to a back-end data module that can be used in some implementations of the present technology for detecting a vehicle accident occurrence.

FIG. 4 is a high-level conceptual diagram illustrating a flow of accident data from multiple information sources to a back-end data module that can be used in some implementations of the present technology for detecting a vehicle accident occurrence and/or providing accident data gathering recommendations. The information sources can include those of a vehicle driver system 402, and more particularly, systems of a vehicle 410, a computing and/or communications device 412, and/or a wearable 414, such as a smart watch or smart glasses. Accident data to be provided by each of the above sources can be communicated through a network 406, which can be similar to network 230 of FIG. 2, to a back-end data module 408. The module 408 can be implemented according to the components of FIG. 3 to comprise a communicator, an analyzer, and a database. The communicator can coordinate push/pull communications from the vehicle system 402 and the analyzer can analyze data of the communications in accordance with implementations of the disclosed technology.

It is contemplated that the vehicle 410, device 412, and/or wearable 414 can provide a myriad of data that can be used by recommendation system 164 to detect a vehicle accident occurrence and then generate one or more accident data gathering recommendations. Such data, as well as data that may be personally provided to the recommendation system 164 by an individual involved in a vehicle accident occurrence, can define investigative accident data that can be used to detect the occurrence.

Accordingly, in some implementations, investigative accident data that can be obtained from the vehicle 410 can include sensor data which can be sourced from any of sensors of the vehicle 410, including, for example, proximity/distance sensors (e.g., Light Detection and Ranging (LiDAR)), an included inertia measuring unit (IMU), weight and pressure sensors as may be respectively disposed in seating and a steering wheel, speed sensors, as well as from any included location/navigation systems. Such investigative accident data can further include images captured by one or more of imaging systems which may be included by the vehicle 410. In some implementations, investigative accident data that can be obtained from the communications device 412 can include, for example, sensor data indicative of positioning and/or acceleration. In some implementations, such sensor data can also be indicative of, for example, ambient lighting, moisture, and barometric pressure. In some implementations, investigative accident data that can be obtained from the wearable 414 can include biometric data including eye movement, blood pressure, heart rate, sleep pattern, and overall movement from a datum, e.g., rotation. In some implementations, investigative accident data can be defined by a comparison between one or more types of data obtained from one or more of vehicle 410, communications device 412, and wearable 414. That is, recommendation system 164 can derive comparison data which can provide further investigative accident data for a vehicle accident occurrence.

In some implementations, it is contemplated that recommendation system 164 can intake one or more of the above-described investigative accident data and combine that data with a first photographic recording for a vehicle accident occurrence as may be provided by a driver and/or passenger of vehicle 410. In such a case, the investigative accident data and the first photographic recording can define initial accident data. Once the initial accident data is obtained by recommendation system 164, it can further use that data for generating one or more accident data gathering recommendations according to FIGS. 5 and 6, as described below.

Figure 5:
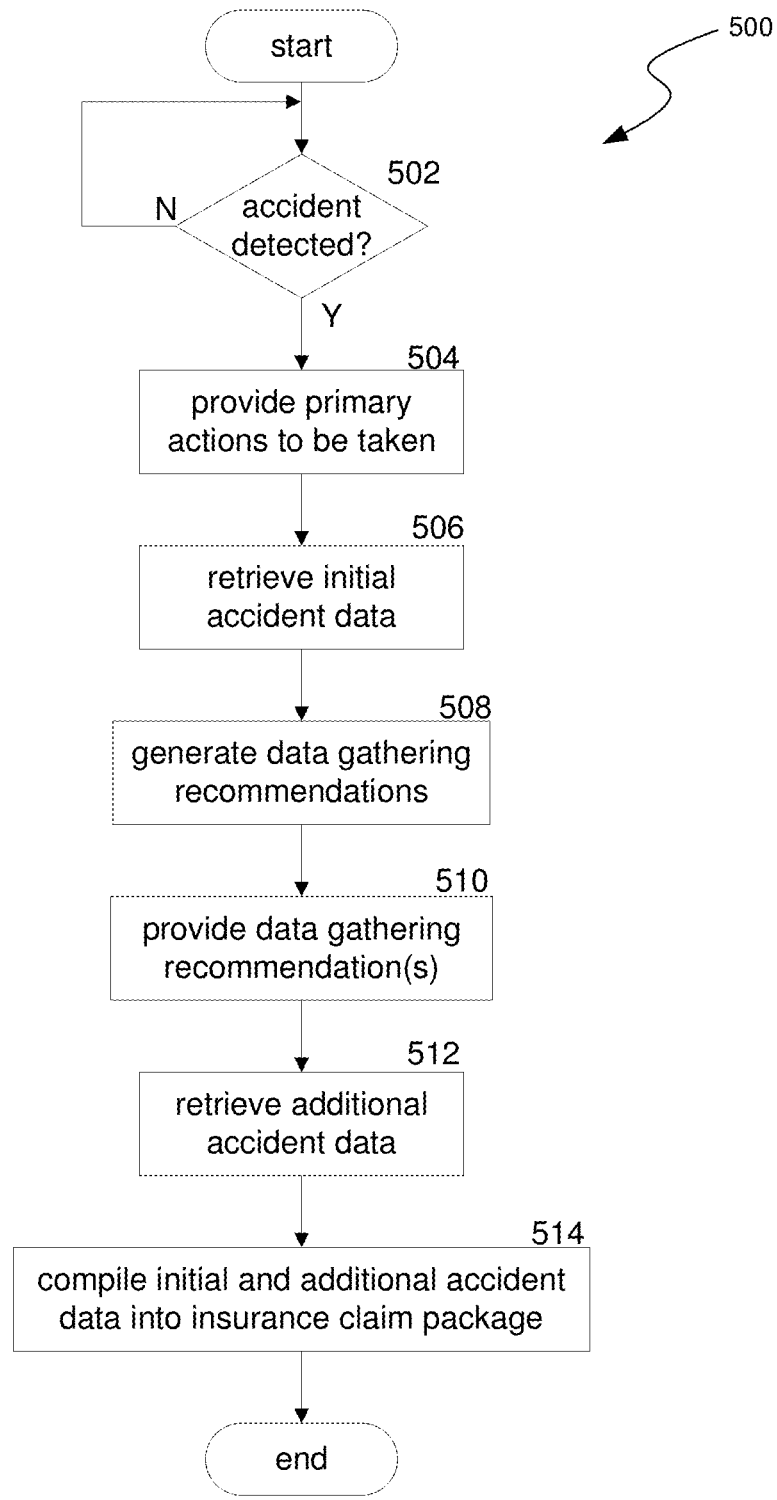
FIG. 5 is a flow diagram illustrating a process used in some implementations for obtaining initial accident data following a vehicle accident occurrence, and then automatedly generating and issuing accident data gathering recommendations.

FIG. 5 is a flow diagram illustrating a process 500 used in some implementations for obtaining initial accident data following a vehicle accident occurrence, and then automatedly generating and issuing accident data gathering recommendations to retrieve additional accident data. Once retrieved, the additional accident data and the initial accident data can be compiled into a package. Process 500 can be initiated by a driver and/or a passenger signing up for the accident data gathering recommendation service as implemented, for example, via the components of FIG. 3, with respect to a given vehicle 410. Process 500 can be performed whenever the accident recommendation system 164 has received investigative data of the driver and/or the passenger during operation of the given vehicle 410.

Process 500 can remain at block 502 until it detects an occurrence of a vehicle accident. In this regard, recommendation system 164 can be configured to receive investigative data for one or more of the driver and/or a passenger of the vehicle 410. For example, the investigative data can include receipt of a phone call or a text message describing an accident scene involving the driver and/or the passenger. The investigative data can further include data of a movement profile for the vehicle 410 as determined, for instance by the vehicle's IMU, as well other sensor data of the vehicle 410. Still further, it is contemplated that the investigative data can include sensory data provided by a wearable 414 of the driver and/or the passenger, as well as that of any computing or communications device 412 included in the vehicle 410. When in receipt of one or more of the above types of data, recommendation system 164 can perform an analysis, which can include one or more comparisons as between different investigative data, to determine an occurrence for a vehicle accident involving vehicle 410. Additional details on detecting a vehicle accident occurrence is provided in commonly owned U.S. patent application Ser. No. 17/560,489, filed Dec. 23, 2021, entitled, "Method and System for Automatedly Detecting a Vehicle Accident," the entire contents of which are hereby incorporated by reference.

At block 504, and in response to a vehicle accident occurrence having been detected, process 500 can generate and transmit recommendations for primary actions to be taken. Such primary actions can include, for example, notifying first responders, evaluating for relevant injury, and obtaining and maintaining a safe location. In some implementations, the primary actions can further include instructions for generating a first photographic record of the accident scene. That is, the instructions can, for example, suggest and/or request that the individual image one or more of any observed impact(s) to the vehicle, observed areas of fluid leakage, a 360° view from inside the vehicle, and observed damage to any other vehicle(s) at the scene of the accident occurrence. In this regard, the obtained images can define a first photographic record for the detected vehicle accident occurrence that can be retrieved, for example, by data module 408.

At block 506, process 500 can retrieve initial accident data for a detected vehicle accident occurrence. In these regards, the initial accident data can include the investigatory data discussed with regard to FIG. 4, as well as a first photographic record for the vehicle accident scene. The first photographic record can be included in the primary actions received by a driver and/or a passenger. Also, as already discussed, the first photographic record can thus include, for example, images of one or more of any observed impact(s) to the vehicle, observed areas of fluid leakage, a 3600 view from inside the vehicle, and observed damage to any other vehicle(s) at the scene of the accident occurrence.

At block 508, process 500 can use the first photographic record to generate accident data gathering recommendations. More particularly, process 500 can provide the first photographic record to a machine learning model trained to generate characteristics for a vehicle accident occurrence. A non-exhaustive list of examples of the characteristics can include a type of vehicle damage, a type of personal bodily injury, a type of personal property damage, presence of witnesses at the scene, a suspicion for damage to a utility at the vehicle accident scene, etc. Once the characteristics are determined, process 500 can map the characteristics to a predetermined listing of accident data gathering recommendations for characteristics of a same or similar type. Process 500 can select one or more of the accident data gathering recommendations as mapped to a respective one or more characteristics. For example, if a characteristic describes vehicle frame damage, one or more recommendations can be generated that provides advice to take photographs of the affected vehicle areas from a certain angle and at a certain distance from the vehicle 410. As another example, if a characteristic describes airbag deployment, one or more recommendations can be generated that provides advice to take photographs inside the vehicle 410, and particularly of each area of the vehicle 410 where airbags are stationed and of passengers who may have sustained injury. Thus, process 500 can generate a second photographic recording for the vehicle accident occurrence. As yet another example, if the characteristic is of a nature requiring personal input from the driver and/or the passenger, a recommendation can include advice for recording an oral and/or video accounting of the vehicle accident occurrence. Additional details on applying a machine learning model to generate accident characteristics and selecting corresponding recommendations are provided below in relation to FIG. 6.

At block 510, process 500 can provide the selected data gathering recommendation(s) to the driver and/or passenger of the vehicle 410. Provisioning of the recommendation(s) can be executed by the communicator of data module 408, as may be implemented according notification module 350.

At block 512, process 500 can, upon one or more of the accident data gathering recommendations being carried out by the driver and/or the passenger of vehicle 410, retrieve additional accident data. As has been described, the additional accident data can be more informative than the initial accident data, and thus may be of assistance to an operator of recommendation system 164, such as an insurance provider, in the performance of claims processing functions.

At block 514, process 500 can compile the initial and additional accident data into a package. In some implementations, the package can be used for a variety of purposes, including, for example, a determination of fault, as a record in a judicial proceeding, an insurance claim, to trigger additional remedial actions (e.g., informing a utility company of possible damage—see FIG. 7, suggesting repair providers, adjusting insurance premiums, providing a tow vehicle or replacement transportation, etc.) and/or as a record that may be provided to one or more affiliates of an operator of the recommendation system. Process 500 can then end.

Figure 6:
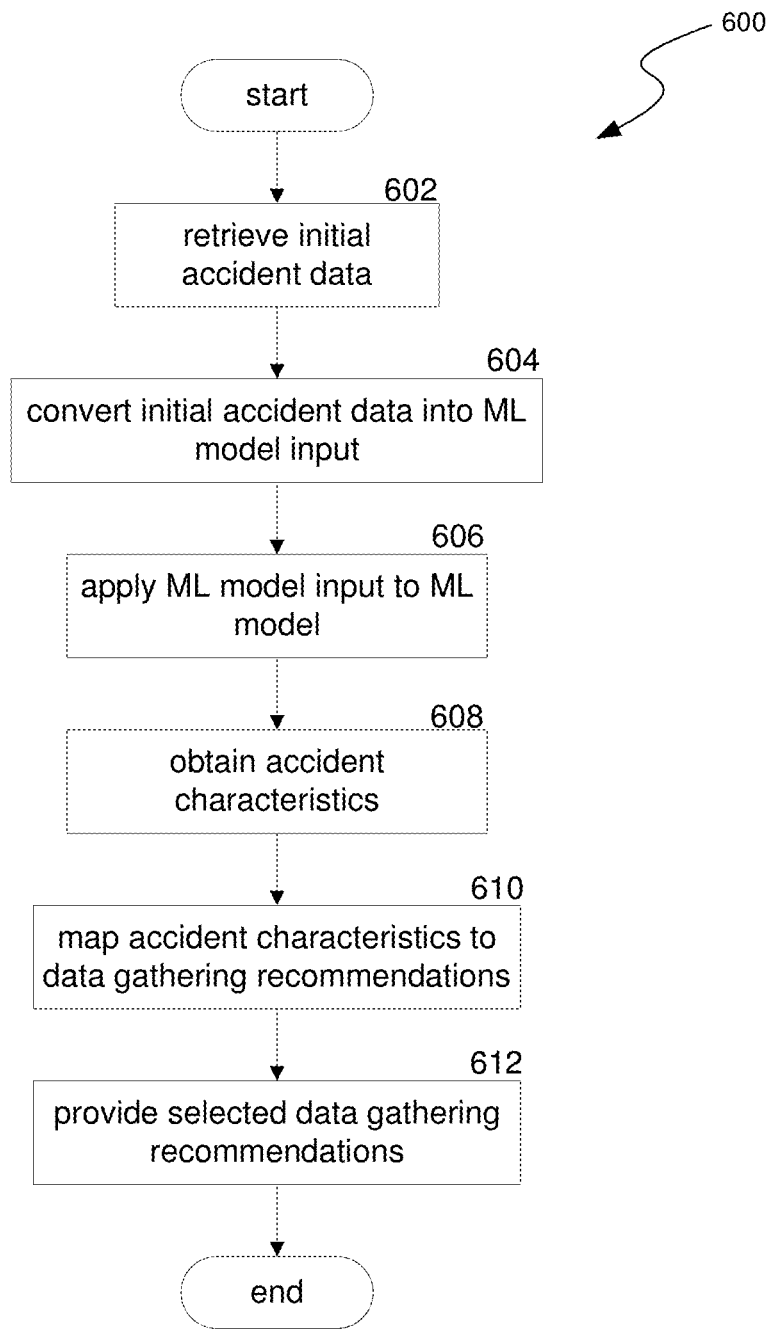
FIG. 6 is a flow diagram illustrating a process used in some implementations for generating one or more accident data gathering recommendations using a machine learning model.

FIG. 6 is a flow diagram illustrating a process 600 used in some implementations for generating one or more accident data gathering recommendations using a machine learning model. Process 600 can be initiated in response to receipt by accident recommendation system 164 of initial accident data from a driver and/or a passenger of vehicle 410 during its operation. Process 600 can be performed during operation of the vehicle 410 and in response to the driver and/or the passenger having signed up to receive accident data gathering recommendations. In some implementations, process 600 can be performed as a sub-process of process 500, e.g., at block 508.

At block 602, process 600 can retrieve initial accident data, as described above. That is, the initial accident data can include the investigative data which caused the detection of a vehicle accident occurrence as well as the data of the first photographic record, the taking of which was generally prompted by receipt of the investigative data.

At block 604, process 600 can convert the initial accident data into machine learning model input. And at block 606, process 600 can apply the machine learning model input generated at block 604 to a machine learning model trained to identify characteristics for the initial accident data.

A "machine learning model" or "model" as used herein, refers to a construct that is trained using training data to make predictions or provide probabilities for new data items, whether or not the new data items were included in the training data. For example, training data for supervised learning can include positive and negative items with various parameters and an assigned classification. Examples of models include: neural networks (traditional, deeps, convolution neural network (CSS), recurrent neural network (RNN)), support vector machines, decision trees, decision tree forests, Parzen windows, Bayes, clustering, reinforcement learning, probability distributions, decision trees, and others. Models can be configured for various situations, data types, sources, and output formats.

The machine learning model can be trained with supervised learning and use training data that can be obtained from prior historical insurance claims records. More specifically, each item of the training data can include an instance of initial accident data for a prior vehicle accident occurrence matched to one or more accident characteristics. The matching can be performed according to a predetermined algorithm configured to receive initial accident data (e.g., movement patterns, images from an accident, car sensor data) from a historical claim record and pair it with results of analysis of the claim, such as what damage occurred, what insurance benefits paid out (e.g., on property, personal injury, etc.), what utilities were affected, whether witness statements were acquired, etc. During the model training a representation of the initial accident data (e.g., histograms of the images, values representing sensor readings, semantic embeddings of claimant descriptions of an accident, etc.) can be provided to the model. Then, the output from the model, i.e., predicted characteristics from the model can be compared to the actual matched characteristics from the accident and, based on the comparison, the model can be modified, such as by changing weights between nodes of the neural network or parameters of the functions used at each node in the neural network (e.g., applying a loss function). After applying each of the pairings of the inputs (initial accident data) and the desired outputs (accident characteristics) in the training data and modifying the model in this manner, the model is trained to evaluate new instances of initial accident data in order to determine characteristics for a vehicle accident occurrence.

Process 600 can convert the initial accident data to input for the machine learning model at block 604. For example, values for the first photographic record, and other data of the investigative data, can be entered into a vector that the machine learning model has been trained to receive. The vector can be a sparse vector in which the values can represent, for example, photographs from a the accident, sensor readings, descriptions of the accident, etc. The model can receive this input at block 606. At block 608, process 600 can obtain, from the model, predicted accident characteristics. As previously discussed, examples of the characteristics can include a type of vehicle damage, a type of personal bodily injury, a type of personal property damage, presence of witnesses at the scene and likelihood of being eyewitnesses, a suspicion for damage to a utility at the vehicle accident scene, etc.

At block 610, process 600 can map one or more of the obtained characteristics to, respectively, one or more accident data gathering recommendations. In this respect, such recommendations can be predetermined, i.e., formulated according to historical insurance claims records evincing one or more benefits derived from implementations of those recommendations. The mapping can demonstrate a correspondence between a given characteristic and a given recommendation. The correspondence can demonstrate that the recommendation fulfills the obtaining of additional accident data with regard to a category for the characteristic. For example, if the characteristic is "vehicle frame damage," then the mapping to a recommendation can be to take photographs from the underside of the car and around a wheel well to capture images advantages to assessing frame damage. In some implementations, the recommendations can include walkthroughs, augmented reality overlays (e.g., showing how to position the camera), etc., helping the user gather further effective accident data. This is the case, for example, the overslay could show where to position the exposed wheel well when taking a photograph to acquire optimal documentation of possible damage surrounding frame portions that inform on the overall state of vehicle body damage. As another example, if the characteristic is "likely eyewitness" (based on initial accident data showing a bystander pointing at the vehicle 410), then the mapping can be to a recommendation instructing the user to attempt to obtain a witness statement. This is the case since the bystander's action of pointing may indicate a result of what the bystander actually saw as the accident occurred.

At block 612, process 600 can provide the data gathering recommendations, selected based on the mapping at block 610. Such recommendations can be transmitted to the driver and/or passenger of vehicle 410 via notification module 350. Upon their being carried out, the recommendations can yield additional accident data that can be more informative than the initial accident data. With this increased information, a provider, such as an operator of recommendation system 164, can be better equipped to develop various determinations for fault, insurance payout, use the package as court evidence, etc. Process 600 can then end (which may then return to process 500).

Figure 7:
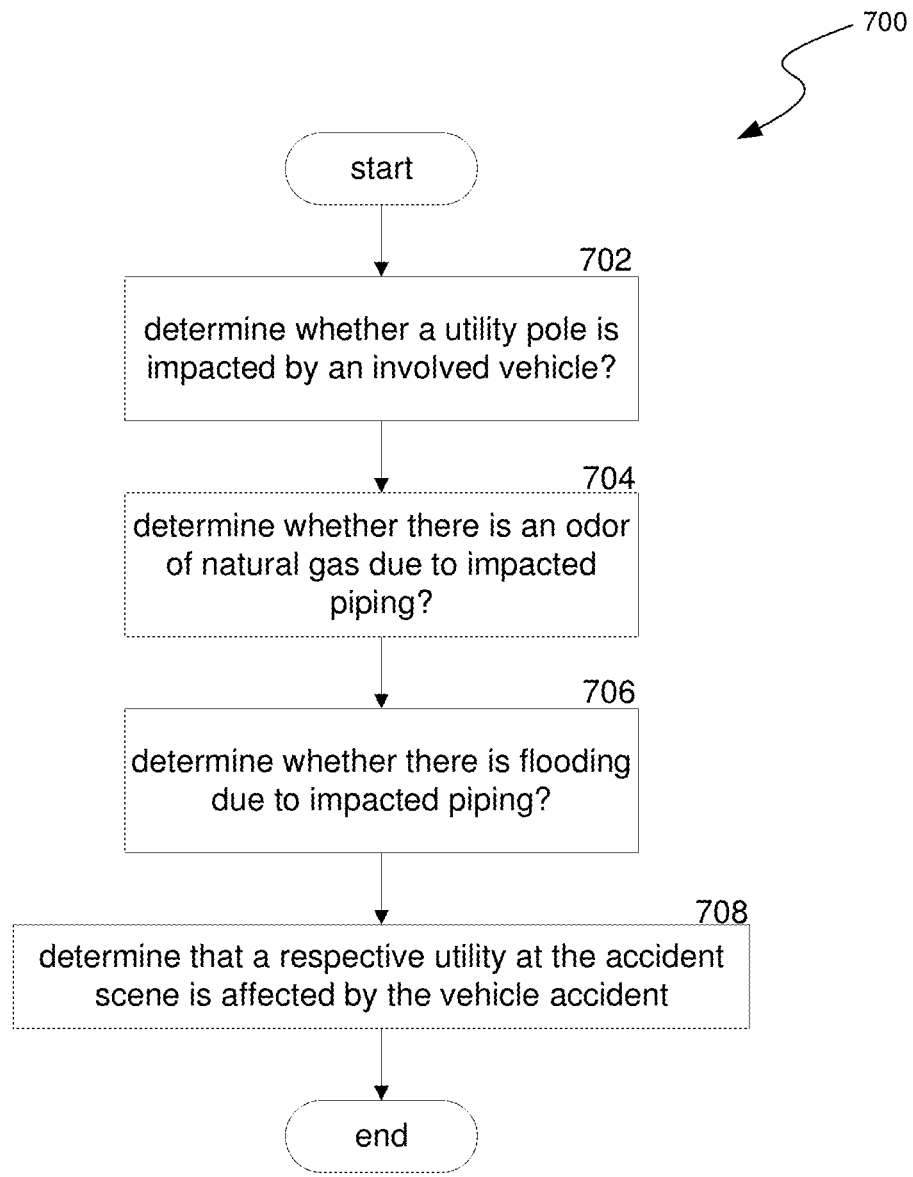
FIG. 7 is a flow diagram illustrating a process used in some implementations to determine whether a utility may have been impacted by a vehicle accident occurrence.

FIG. 7 is a flow diagram illustrating a process 700 used in some implementations to determine whether a utility may have been impacted by a vehicle accident occurrence. In some implementations, process 600 can provide a data gathering recommendation instructing a user to gather additional data to conduct process 700. For example, if initial accident data included images depicting utility property and/or location data for the accident indicated there is utility property in the vicinity, the model can produce an accident characteristic for "utilities possibly impacted" which can be mapped to providing a data gathering recommendation for performing a further utility damage assessment. Process 700 can be performed by a driver and/or passenger of vehicle 410 carrying out an inspection of utility equipment that is observed to have been impacted by a vehicle accident occurrence.

At block 702, process 700 provides a recommendation prompting the driver and/or the passenger to determine whether a utility pole, perhaps belonging to a telecommunications provider or electricity provider, has been impacted by the occurrence of the vehicle accident. In other words, the recommendation can direct the driver and/or the passenger to observe the accident scene for the relevant impact and provide a response indicating whether such damage occurred.

At block 704, process 700 provides a recommendation to prompt the driver and/or the passenger to determine whether a natural gas provider has been impacted by the occurrence of the vehicle accident. More particularly, the recommendation can direct the driver and/or the passenger to smell for the presence of natural gas such that an associated odor would not otherwise present itself but for the vehicle accident occurrence and provide a response indicating whether such an odor is found.

At block 706, process 700 provides a recommendation to prompt the driver and/or the passenger to learn whether a water utility has been impacted by the vehicle accident occurrence. That is, the recommendation can direct the driver and/or the passenger to observe whether the occurrence has caused flooding at the accident scene and provide a response indicating whether such flooding occurred.

At block 708, process 700 can, upon receipt of a response for any of the recommendations at blocks 702, 704, and 706, provide additional accident data (see block 512 of FIG. 5) as to whether a respective one or more utilities at the vehicle accident scene have been affected by the vehicle accident occurrence. With this information, a provider operating as the provider of recommendation system 164, can, for example notify the utility provider to come make repairs, determine the extent of payout amounts that may be incurred as a result of the vehicle accident occurrence, instruct the drier to avoid dangerous utility hazards, etc. Process 700 can then end.

Figure 8A:
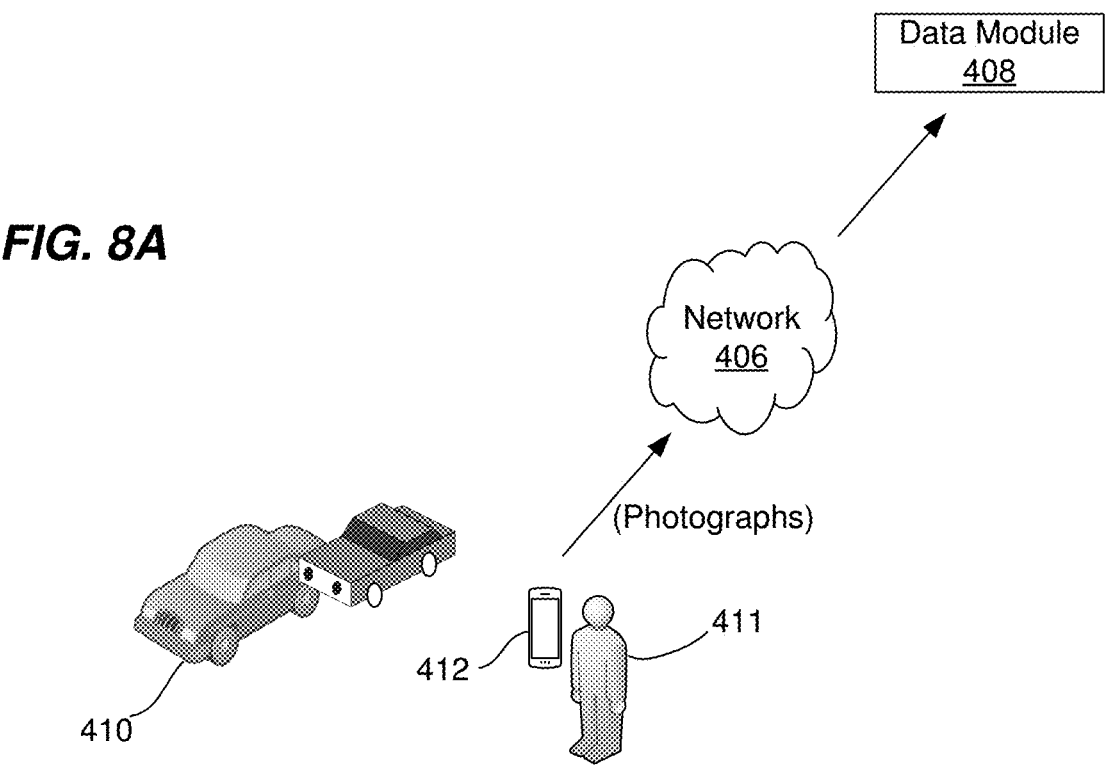
FIGS. 8A and 8B show a pictorial representation, according to some implementations, of an interplay between a retrieval of initial accident data for a vehicle accident occurrence and generation of one or more accident data gathering recommendations using the retrieved initial data.
Figure 8B:
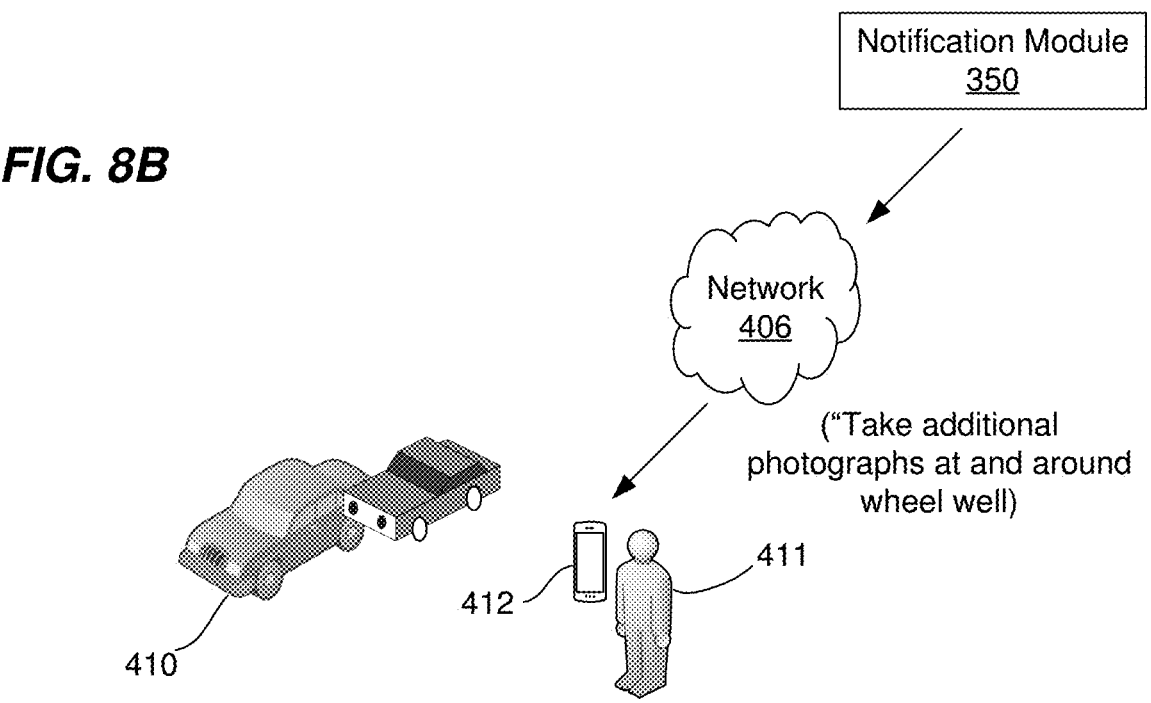

FIGS. 8A and 8B show a pictorial representation, according to some implementations, of an interplay between a retrieval of initial accident data for a vehicle accident occurrence and generation of one or more accident data gathering recommendations for obtaining additional accident data.

In referring to FIG. 8A, there is shown an instance of a rear end collision for vehicle 410. According to some implementations of the present technology, recommendation system 164 has invoked investigative data retrieved from the vehicle 410 to detect the occurrence of the collision. In response, recommendation system 164 has issued primary actions for the driver 411 to take, including to move a safe distance away from the collision and to take photographs of the collision. As shown, such photographs are uploaded from the driver's cellular telephone 412 to data module 408, via network 406. Once this occurs, the photographs (constituting a first photographic record for the collision, as discussed herein), are analyzed by recommendation system 164 to determine one or more accident data gathering recommendations according to implementations of the present technology (e.g., using process 500).

In referring to FIG. 8B, there is shown the transmission of at least one accident data gathering recommendation provided by notification module 350. More particularly, and because the initial accident data photographs generated the accident characteristic of "frame damage," recommendation system 164 produced the recommendation mapped to that characteristic. As shown, the recommendation is to "Take additional photographs from underneath the vehicle (unless there are any fluid leaks, gas smell, or other hazards)." Thus, as can be understood, execution of the recommendation can yield documentary evidence of an extent of frame damage that might not have been captured by the initial accident photographs. In this way, an insurance provider operating recommendation system 164 can obtain much needed information for the collision that can be useful when, for example, determining a corresponding payout amount for the collision.

Several implementations of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Reference in this specification to "implementations" (e.g. "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method of automatically issuing accident data recommendations for a vehicle accident occurrence, the method comprising:
    detecting, for a vehicle, an occurrence of a vehicle accident;
    in response to the detecting, providing an instruction to an individual to (a) obtain one or more first images of damage at a scene of the detected accident and (b) provide one or more language descriptions of the scene of the detected accident;
    in response to the detecting, automatically retrieving initial accident data for the detected vehicle accident by retrieving a reading from at least one sensor, of the vehicle, comprising a proximity sensor, distance sensor, camera, and/or pressure sensor;
    generating one or more accident data recommendations by:
        converting, into input for a machine learning model, the one or more first images, the one or more language descriptions, and the initial accident data, wherein,
            the one or more first images are converted to image values, the one or more language descriptions are converted into one or more semantic embeddings, and the initial accident data is converted into values representing sensor readings; and
            the machine learning model is trained to predict one or more accident characteristics for the detected vehicle accident using training data comprising initial accident data for prior vehicle accident occurrences matched to accident characteristics, the initial accident data of the training data comprising images, language descriptions, and vehicle sensor readings;
        applying the input to the machine learning model to obtain the accident characteristics for the detected vehicle accident, one or more accident characteristics comprising a vehicle damage type;
        selecting the one or more accident data recommendations respectively mapped to the accident characteristics, the recommendations comprising c) generating one or more second images corresponding to one or more of the respective accident characteristics, and d) one or more of generating an oral and/or video accounting of the detected vehicle accident, obtaining a witness statement, determining whether any utility property was impacted as a result of the detected vehicle accident, or any combination thereof;
    providing, to the individual involved in the detected vehicle accident via at least an augmented reality device, the selected accident data recommendations and receiving additional accident data, wherein the providing includes:
        causing the augmented reality device to display an augmented reality overlay that provides guidance for obtaining the one or more second images;
    compiling the initial accident data and the additional accident data into a vehicle accident package that represents a state of the scene of the detected accident; and
    maintaining the machine learning model by updating the training of the machine learning model using at least the obtained one or more accident characteristics.

2. The method of claim 1,
    wherein the detecting the vehicle accident is based on at least one of (e) a personal description by the individual involved in the detected vehicle accident, (f) the reading from at least one sensor of the vehicle, (g) a reading from at least one sensor of one or more of mobile or wearable computing devices, or (h) any combination thereof.

3. The method of claim 1,
    wherein the one or more first images include one or more of (i) at least one image of observed impact(s) to the vehicle, (j) at least one image of an observed area of fluid leakage from the vehicle, (k) at least one image for a 360 degree view from an inside the vehicle, (l) at least one image of observed damage to another vehicle at a scene of the detected vehicle accident, or (m) any combination thereof.

4. The method of claim 1,
    wherein the one or more accident characteristics for the detected vehicle accident comprise one or more of (n) a type of injury for one or more individuals, (o) a likelihood of presence of an eyewitness to the detected vehicle accident, (p) a likelihood of damage to a utility, or (q) any combination thereof.

5. The method of claim 1,
    wherein the one or more accident data recommendations are predetermined, and are mapped to accident characteristics.

6. The method of claim 1, wherein the automatically retrieving, in response to the detecting, the initial accident data further comprises:
    obtaining, from a wearable computing device, biometric data comprising an overall rotation, relative to a datum, of the individual involved in the detected vehicle accident or of an other individual involved in the detected vehicle accident.

7. The method of claim 6, wherein the biometric data is converted into sensor readings for the machine learning model input.

8. A computing system for automatically issuing accident data recommendations for a vehicle accident occurrence, the computing system comprising:
    one or more processors; and
    one or more memories storing instructions that, when executed by the one or more processors, cause the computing system to perform a process comprising:
        detecting, for a vehicle, an occurrence of a vehicle accident;
        in response to the detecting, providing an instruction to an individual to a) obtain one or more first images of damage at a scene of the detected accident and (b) provide one or more language descriptions of the scene of the detected accident;

in response to the detecting, automatically retrieving initial accident data for the detected vehicle accident by retrieving a reading from at least one sensor, of the vehicle, comprising a proximity sensor, distance sensor, camera, and/or pressure sensor;

generating one or more accident data recommendations by:

converting, into input for a machine learning model, the one or more first images, the one or more language descriptions, and the initial accident data, wherein, the one or more first images are converted to image values, the one or more language descriptions are converted into one or more semantic embeddings, and the initial accident data is converted into values representing sensor readings;

the machine learning model is trained to predict one or more accident characteristics for the detected vehicle accident using training data comprising initial accident data for prior vehicle accident occurrences matched to accident characteristics, the initial accident data of the training data comprising images, language descriptions, and vehicle sensor readings;

applying the input to the machine learning model to obtain the accident characteristics for the detected vehicle accident, one or more accident characteristics comprising a vehicle damage type; and selecting the one or more accident data recommendations respectively mapped to the accident characteristics, the recommendations comprising c) generating one or more second images corresponding to one or more of the respective accident characteristics, and d) one or more of generating an oral and/or video accounting of the detected vehicle accident, obtaining a witness statement, determining whether any utility property was impacted as a result of the detected vehicle accident, or any combination thereof;

providing, to the individual involved in the detected vehicle accident via at least an augmented reality device, the selected accident data recommendations, wherein the providing includes:

causing the augmented reality device to display an augmented reality overlay that provides guidance for obtaining the one or more second images;

retrieving, in response to the providing one or more accident data recommendations, additional accident data that represents a state of the vehicle accident at the accident scene, wherein the additional accident data is used in one or more of: an insurance claim process, a determination of fault for the detected vehicle accident, selecting a remedial action for the detected vehicle accident, or any combination thereof; and maintaining the machine learning model by updating the training of the machine learning model using at least the obtained one or more accident characteristics.

9. The computing system of claim 8, wherein the initial accident data for the detected vehicle accident comprises a reading from at least one sensor of one or more of a mobile or wearable computing device, involved in the detected vehicle accident.

10. The computing system of claim 8, wherein the one or more first images include one or more of (e) at least one image of observed impact(s) to the vehicle, (f) at least one image of an observed area of fluid leakage from the vehicle, (g) at least one image for a 360 degree view from an inside the vehicle, (h) at least one image of observed damage to another vehicle at a scene of the detected vehicle accident, or (i) any combination thereof.

11. The computing system of claim 8, wherein the one or more accident characteristics for the detected vehicle accident comprise one or more of (j) a type of injury for one or more individuals, (k) a likelihood of presence of an eyewitness to the detected vehicle accident, (l) a likelihood of damage to a utility, or (m) any combination thereof.

12. The computing system of claim 8, wherein the one or more accident data recommendations are predetermined, and are mapped to accident characteristics.

13. A machine-readable storage medium having machine-executable instructions stored thereon that, when executed by one or more processors, cause the one or more processors to perform a method for automatedly issuing accident data recommendations for a vehicle accident occurrence, the method comprising:

detecting, for a vehicle, a vehicle accident occurrence;

in response to the detecting, providing an instruction to an individual to a) obtain one or more first images of damage at a scene of the detected accident and b) provide one or more language descriptions of the scene of the detected accident;

in response to the detecting, automatically retrieving initial accident data for the detected vehicle accident by retrieving a reading from at least one sensor, of the vehicle, comprising a proximity sensor, distance sensor, camera, and/or pressure sensor;

generating one or more accident data recommendations by:

converting, into input for a machine learning model, the one or more first images, the one or more language descriptions, and the initial accident data, wherein, the one or more first images are converted to image values, the one or more language descriptions are converted into one or more semantic embeddings, and the initial accident data is converted into values representing sensor readings;

the machine learning model is trained to predict one or more accident characteristics for the detected vehicle accident using training data comprising initial accident data for prior vehicle accident occurrences matched to accident characteristics, the initial accident data of the training data comprising images, language descriptions, and vehicle sensor readings;

applying the input to the machine learning model to obtain the accident characteristics for the detected vehicle accident, one or more accident characteristics comprising a vehicle damage type; and selecting the one or more accident data recommendations respectively mapped to the accident characteristics, the recommendations comprising c) generating one or more second images corresponding to one or more of the respective accident characteristics, and d) one or more of generating an oral and/or video accounting of the detected vehicle accident, obtaining a witness statement, determining whether any utility property was impacted as a result of the detected vehicle accident, or any combination thereof;

providing, to the individual involved in the detected vehicle accident via at least an augmented reality device, the selected accident data recommendations, wherein the providing includes:

causing the augmented reality device to display an augmented reality overlay that provides guidance for obtaining the one or more second image;

retrieving, in response to the providing one or more accident data recommendations, additional accident data that represents a state of the vehicle accident at the accident scene, wherein the additional accident data is used in one or more of: an insurance claim process, a determination of fault for the detected vehicle accident, selecting a remedial action for the detected vehicle accident, or any combination thereof; and maintaining the machine learning model by updating the training of the machine learning model using at least the obtained one or more accident characteristics.

14. The machine-readable storage medium of claim 13, wherein the initial accident data for the detected vehicle accident comprises a reading from at least one sensor of one or more of a mobile or wearable computing device, involved in the detected vehicle accident.

15. The machine-readable storage medium of claim 14, wherein the detecting the detected vehicle accident is based on at least one of (e) a personal description by the individual involved in the detected vehicle accident, (f) a reading from at least one sensor of the vehicle involved in the detected vehicle accident, (g) a reading from at least one sensor of one or more mobile or wearable computing devices involved in the detected vehicle accident, or (h) any combination thereof.

16. The machine-readable storage medium of claim 14, wherein the one or more first images include one or more of (i) at least one image of observed impact(s) to the vehicle, (j) at least one image of an observed area of fluid leakage from the vehicle, (k) at least one image for a 360 degree view from an inside the vehicle, (l) at least one image of observed damage to another vehicle at a scene of the detected vehicle accident, or (m) any combination thereof.

17. The machine-readable storage medium of claim 14, wherein the one or more accident characteristics for the detected vehicle accident comprise one or more of (n) a type of injury for one or more individuals, (o) a likelihood of presence of an eyewitness to the detected vehicle accident, (p) a likelihood of damage to a utility, or (q) any combination thereof.

18. The machine-readable storage medium of claim 17, wherein the one or more accident characteristics for the detected vehicle accident comprise at least a likelihood of presence of an eyewitness to the detected vehicle accident and/or a likelihood of damage to a utility.

\* \* \* \* \*